United States Patent
Ota et al.

[11] Patent Number: 5,841,948
[45] Date of Patent: Nov. 24, 1998

[54] DEFUZZIFYING METHOD IN FUZZY INFERENCE SYSTEM

[75] Inventors: Ken Ota, Yokohama, Japan; William C. Archibald, Austin, Tex.

[73] Assignee: Motorola, Inc., Schaumburg, Ill.

[21] Appl. No.: 424,737

[22] Filed: Apr. 18, 1995

Related U.S. Application Data

[63] Continuation-in-part of Ser. No. 132,613, Oct. 6, 1993, abandoned.

[51] Int. Cl.$^6$ .................................................... G06F 9/44
[52] U.S. Cl. ................................. 395/61; 395/3; 395/51; 395/900
[58] Field of Search .............................. 395/3, 61, 900, 395/51

[56] References Cited

U.S. PATENT DOCUMENTS

| | | | |
|---|---|---|---|
| 5,073,863 | 12/1991 | Zhang | 395/3 |
| 5,124,916 | 6/1992 | Tokoro et al. | 364/424.1 |
| 5,126,600 | 6/1992 | Zhang | 395/3 |
| 5,142,664 | 8/1992 | Zhang | 395/3 |
| 5,167,005 | 11/1992 | Yamakawa | 395/3 |
| 5,184,131 | 2/1993 | Ikeda | 341/165 |
| 5,222,191 | 6/1993 | Enomoto | 395/3 |
| 5,245,698 | 9/1993 | Matsunaga | 395/61 |
| 5,247,432 | 9/1993 | Ueda | 364/162 |
| 5,295,226 | 3/1994 | Yamakawa | 395/3 |
| 5,305,424 | 4/1994 | Ma et al. | 395/51 |
| 5,317,674 | 5/1994 | Muraji | 395/3 |
| 5,446,827 | 8/1995 | Shigeoka et al. | 395/11 |
| 5,463,719 | 10/1995 | Okazaki | 395/3 |
| 5,495,558 | 2/1996 | Tashima | 395/61 |
| 5,497,449 | 3/1996 | Miyazawa | 395/3 |
| 5,537,514 | 7/1996 | Nishidai | 395/900 |

OTHER PUBLICATIONS

Peters, L., K. Beck and R. Camposano, "Fuzzy Logic Controller with Dynamic Rule Set," Institute for Systems Design Technology, German National Research (GMD), Schloss Birlinghoven, D5205 St. Augustin, German, pp. 216–219.

*Primary Examiner*—George B. Davis

[57] ABSTRACT

In a fuzzy inference system using a plurality of output label membership functions $mB_i(y)$, each of which is represented by a singleton having a position $y_i$ and a consequent grade $g_i$, a defuzzifying method comprising the steps of: selecting and identifying n singletons in magnitude order of the consequent grade as $g_1, g_2, \ldots, g_n$ ($g_1$ is the highest); and obtaining the center of gravity $y_0$ as the final result of defuzzification, by calculating the following approximate equation (n=2, 3, . . . )

$$y_0 \approx y_1 + g_2 \, (y_2 - y_1) + g_3 \, (y_3 - y_1) + \ldots + g_n (y_n - y_1).$$

8 Claims, 7 Drawing Sheets

DEFUZZIFYING METHOD IN FUZZY INFERENCE SYSTEM

This application is a continuation-in-part of application Ser. No. 08/132,613, filed Oct. 6, 1993, now abandoned.

FIELD OF THE INVENTION

The present invention relates to a defuzzifying method in a fuzzy inference system which is utilized for controlling various consumer electronics, automobiles and the like.

BACKGROUND OF THE INVENTION

It is well known in the art to widely use fuzzy logic control based on fuzzy inference in controlling various consumer electronics, household appliances, automobiles, cameras and the like. In the fuzzy control, in general, if fuzzy conception or fuzzy condition "A" holds well, then control "X" is executed. This proposition is represented by a fuzzy rule "if A then X". More specifically, control "X" is executed in a degree determined by how well a fact indicated by input data conforms to fuzzy conception "A". In this fuzzy rule, A is referred to as "antecedent" and X as "consequent". An input label is used for identifying each input fuzzy conception or condition. Accordingly a fuzzy conception is referred to also as an "input label". The degree of conformity of the fact to fuzzy conception A is called "input label grade". An output label is also used for identifying each output fuzzy conception or control included in the consequents of fuzzy rules. Therefore, an output fuzzy conception is referred to as an "output label". The degree of executing consequent "X" can be calculated and called an "output label grade" or "consequent grade".

It is necessary to calculate an input label grade with regard to each fuzzy conception. Then min-max computations are performed on the input label grades to obtain output label grades. The degree how control "X" is executed can be determined by its output data (the final result) from the fuzzy inference system. The final result is obtained in a defuzzifying process, where output label membership functions are reduced depending on their output label grades respectively and the center of gravity of the output label membership functions is calculated. In prior defuzzifying processes, a center of gravity (COG) method, a simplified center of gravity (COG) method and a highest method are known, which will be explained below.

Three membership function $mB_1(y)$, $mB_2(y)$ and $mB_3(y)$ for three output labels B1, B2 and B3 are shown in FIG. 2. Each of the membership functions defines the grade of the associated output label with respect to fuzzy variable y. The top portion of each of the membership functions is trapezoidally sliced so as to have a height of its consequent grade gi which is calculated through the min-max computation on input label grades.

First, according to the most precise center of gravity method, the center of gravity, y0, is obtained by the following equation $$y0 = [\Sigma_{i=1,2,3} \Sigma y \; y \cdot mBi(y)] / [\Sigma_{i=1,2,3} \Sigma y \; mBi(y)] \quad (1)$$

where a fuzzy variable y is discrete and $\Sigma y$ means sum over the whole are of the fuzzy variable y.

Next, according to the simplified center of gravity (COG) method, membership functions shown in FIG. 2 are approximated by singletons having typical position y1, y2, y3 respectively and a unit height. Each of the singletons are shortened so as to have the same height as the associated consequent grade g1, g2, g3. The center of gravity, y0, is obtained by the following equation $$y0 \approx \Sigma_{i=1,2,3}(yi \cdot gi) / \Sigma_{i=1,2,3}(gi). \quad (2)$$

Lastly, according to the simplest height method, the center of gravity y0 is approximated only by the position y1 of the largest g1 among the shortened singletons gi.

$$y0 \approx y1. \quad (3)$$

Prior art fuzzy control systems have been used mainly in low speed control applications such as home appliances. However, when fuzzy control systems are desired to be used in high speed and relatively complicated control applications such as cruise controls or suspension control of vehicles and the like, computing speed should be significantly improved to typically 1000 times faster than the conventional one. The improvement of the computation speed is achieved by synergistically tuning three computation stages: the grade calculations of input labels, the min-max operations performed on the input label grades to obtain output label grades, and the calculations of the center of gravity of output label's membership functions.

In some prior art fuzzy inference systems, the center or gravity of output label's membership functions is obtained by the center of gravity (COG) method in low speed application. However, the center of gravity (COG) method is too slow and can not be used for the recent high speed application. The highest method provides high speed calculation, but can not suppress overshoot or undershoot due to insufficient accuracy.

SUMMARY OF THE INVENTION

Accordingly, it is an object of the present invention is to provide a defuzzifying method for a fuzzy inference system.

More particularly, it is an object of the present invention to provide such a defuzzifying method with both fast calculation speed and sufficiently high accuracy.

These and other objects and advantages of the present invention are provided by a defuzzifying method for a fuzzy inference system using a plurality of output label membership functions $mBi(y)$, each of which is represented by a singleton having a position yi and a consequent grade gi. The defuzzifying method comprises the steps of: selecting and identifying n singletons in magnitude order of the consequent grade as g1, g2, . . . , gn (g1 is the highest); and obtaining the center of gravity y0 as the final result of defuzzification, by calculating the following approximate equation (n=2, 3, . . . )

$$y0 \approx y1 + g2(y2-y1) + g3(y3-y1) + \ldots + gn(yn-y1).$$

According to another feature of the invention, there is provided a defuzzifying method comprising the steps of: defining the position y1 of a predetermined singleton g1 as zero; selecting and identifying n−1 singletons (other than g1) in magnitude order of the consequent grade as g2, g3, . . . , gn (g2 is the highest); and obtaining the center of gravity y0 as the final result of defuzzification, by calculating the following approximate equation (n=2, 3, . . . )

$$y0 \approx g2 y2 + g3 y3 + \ldots + gn \; yn.$$

These and other objects and advantages of the present invention will be apparent from the detailed description below taken together with the drawings.

DETAILED DESCRIPTION OF THE INVENTION

The present invention provides a data processing system which implements a fuzzy logic system which performs a defuzzification operation quickly and accurately. In a first embodiment of the invention, the data processing system performs the defuzzification operation by selecting and identifying n singletons in magnitude order of the consequent grade as g1, g2, . . . , gn, where g1 is the highest. The data processing system then obtains the center of gravity, y0, as the final result of a defuzzification operation by calculating the following approximate equation, where n=2,3 , . . . :

$$y0 \approx y1+g2(y2-y1)+g3(y3-y1) +. . .+gn\ (yn-y1).$$

In a second embodiment of the invention, the data processing system performs the defuzzification operation by executing the steps of defining the position, y1, of a predetermined singleton g1 as zero. The data processing system then selects and identifies "n–1" singletons (other than g1) in a magnitude order of the consequent grade as g2, g3, . . . , gn, where g2 is the highest. The data processing system then obtains the center of gravity, y0, as the final result of the defuzzification operation by calculating the following approximate equation, where n=2, 3 , . . . :

$$y0 \approx g2y2+g3y3+. . .+gn\ yn.$$

Before describing execution of the defuzzification operation in more detail, the fuzzy logic system which is implemented in the data processing system referred to above will be described in greater detail. Please note that during a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a hexadecimal value may be indicated by a "$" symbol preceding a value.

Figure 1:
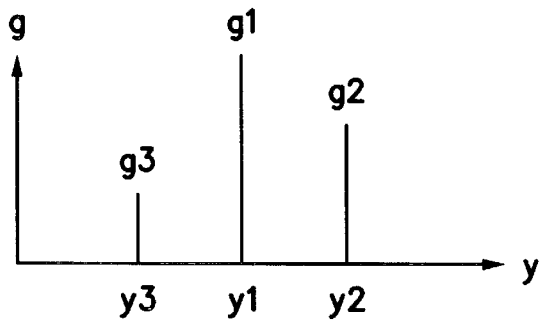
FIG. 1 shows three singletons for explaining the conception of the present invention comparing with a prior highest method.
Figure 2:
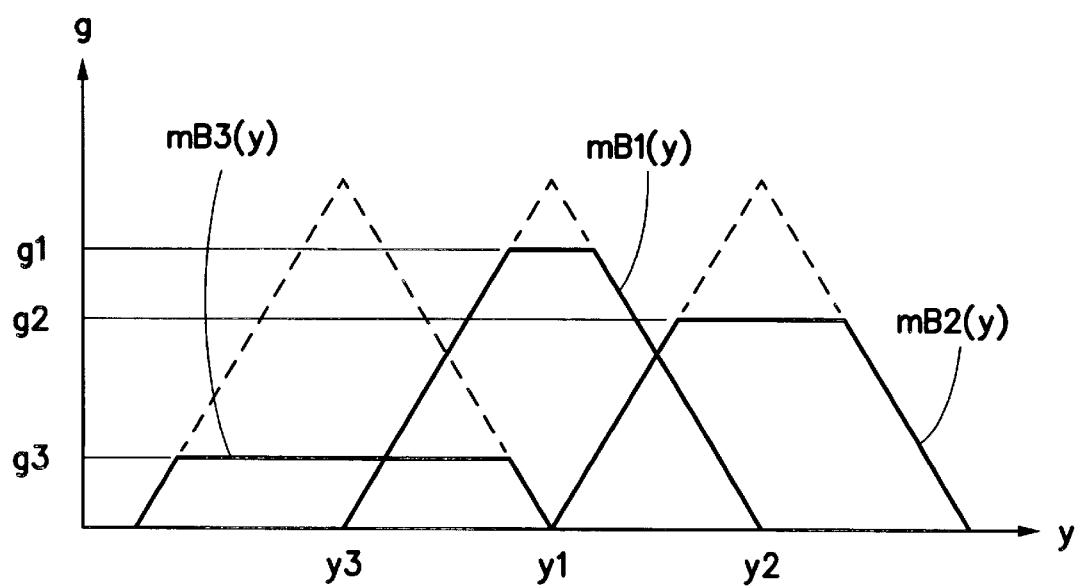
FIG. 2 shows three membership functions for explaining a prior center of gravity (COG) method.
Figure 8:
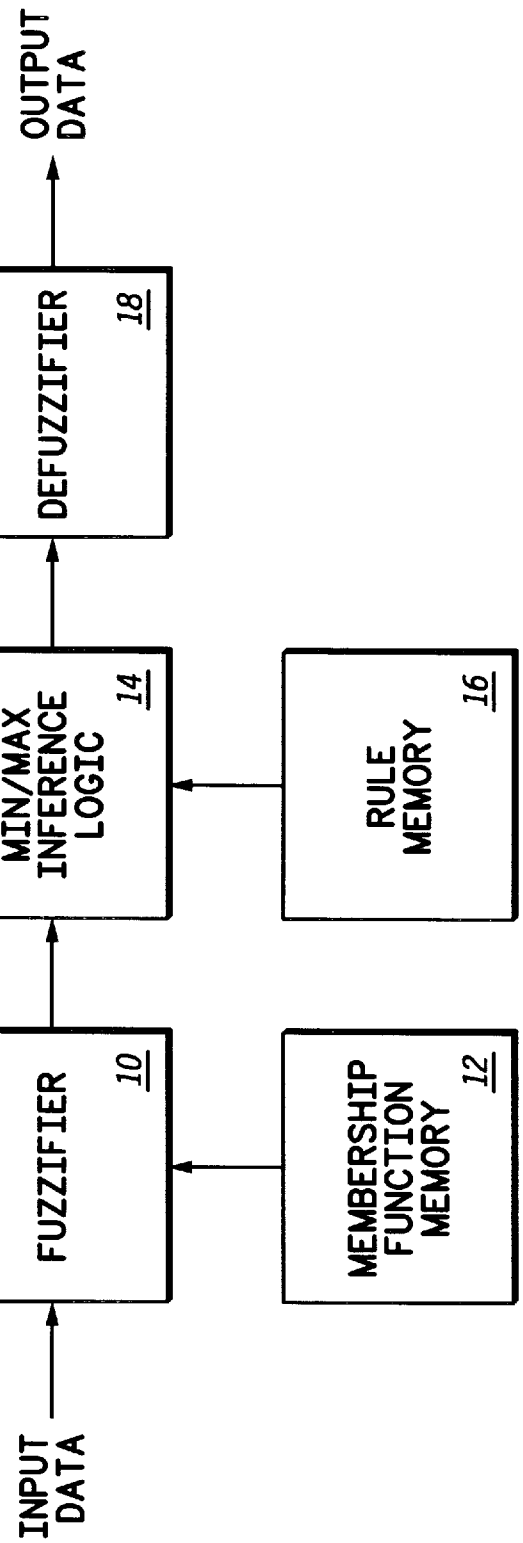
FIG. 8 is a block diagram of a fuzzy logic system in which the present invention is implemented.

In the fuzzy logic system of FIG. 8, input data is input to fuzzifier 10 to be "graded" according to membership functions stored in memory 12. FIG. 2 illustrates an example of several membership functions in which input data is graded, g1, g2, and g3. The graded input data labels are subsequently provided to inference logic 14 where each of the graded input labels are compared to a set of rules stored in rule memory 16. Each of the set of rules is associated with one output label of a plurality of output labels. Inference logic 14 determines which of the graded input labels within any given inference rule has a minimum graded value and then which of the minimum graded values for each of the output labels has a maximum graded value. Generally, these operations require many repetitions of the comparisons of the input labels to each other to determine minimum values and, subsequently, to determine the maximum of all the minimums. The maximum is referred to as an output label. After the output labels are calculated, inference logic 14 provides each to defuzzifier 18. Defuzzifier 18 takes the grades of the output labels and determines a center of gravity of all the output labels by weighting the values of all the output labels to determine a gravity center point.

Figure 9:
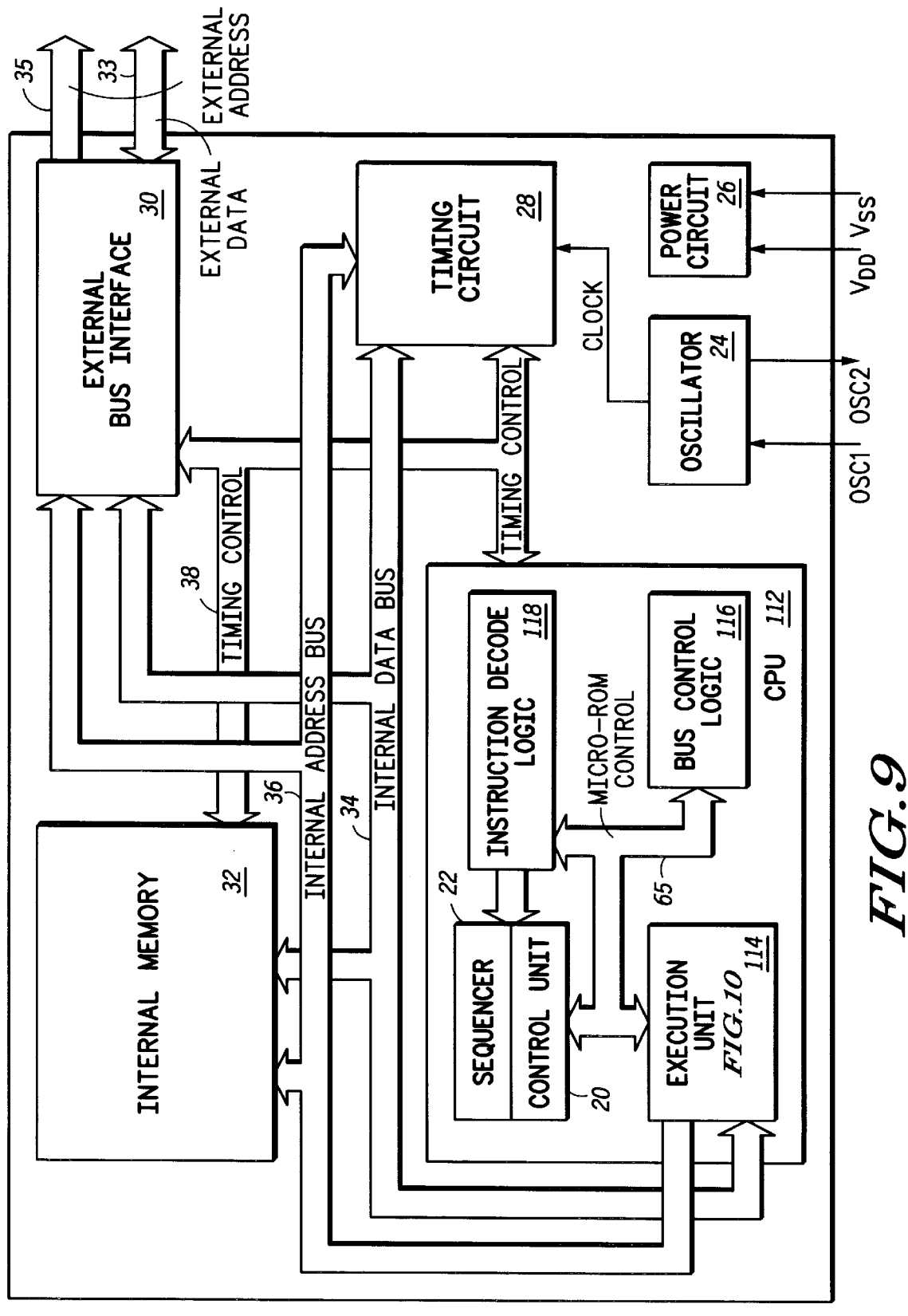
FIG. 9 is a block diagram of a data processor in which the fuzzy logic system of FIG. 8 may be implemented.

FIG. 9 illustrates a data processing system for implementing a fuzzy logic system such as that illustrated in FIG. 8. FIG. 9 depicts a data processing system 110 in which the fuzzy logic system and the method for executing the defuzzification operation may be implemented in the present invention. Data processing system 110 generally includes a central processing unit (CPU) 112, an oscillator 24, a power circuit 26, a timing circuit 28, an external bus interface 30, and an internal memory 32. CPU 112 generally has an execution unit 114, a bus control logic circuit 116, an instruction decode logic circuit 118, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of data processing system 110. Operation of a crystal oscillator is well known in the data processing art and should be apparent to one with ordinary skill in the art.

Power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of data processing system 10. The routing of these signals is well known in data processing art and will be apparent to one with ordinary skill in the art.

Timing circuit 28 receives the Clock signal and subsequently provides appropriate timing signals to each of CPU 112, external bus interface 30, and internal memory 32 via a Timing Control bus 38.

A plurality of address values are provided from external bus interface 30 to an External Address bus 35. Similarly, a plurality of data values are communicated by external bus interface 30 via an External Data bus 33. External bus interface 30 controls receipt and transmission of address and data values between an external user and data processing system 10. External bus interface 30 communicates a plurality of address and data values to a remaining portion of data processing system 10 via an Internal Address bus 36 and an Internal Data bus 34, respectively.

Internal memory 32 functions to store information necessary for the proper operation of data processing system 110. Additionally, other data values may be stored therein if specified in a user program provided via Internal Address bus 36 and Internal Data bus 34. For example, membership function memory 12 and rule memory 16 of FIG. 8 would probably be stored in internal memory 32 of data processing system 110.

CPU 112 executes each of the instructions required during operation of data processing system 110. Internal Address bus 36 and Internal Data bus 34 communicate information between execution unit 114 and a remaining portion of data processing system 110. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of data processing system 110. Additionally, control unit 20 includes a Micro-ROM memory (not shown) which provides a plurality of control information to each of execution unit 114, bus control logic 116, and instruction decode logic 118 via a Micro-ROM Control Bus 65.

Figure 10:
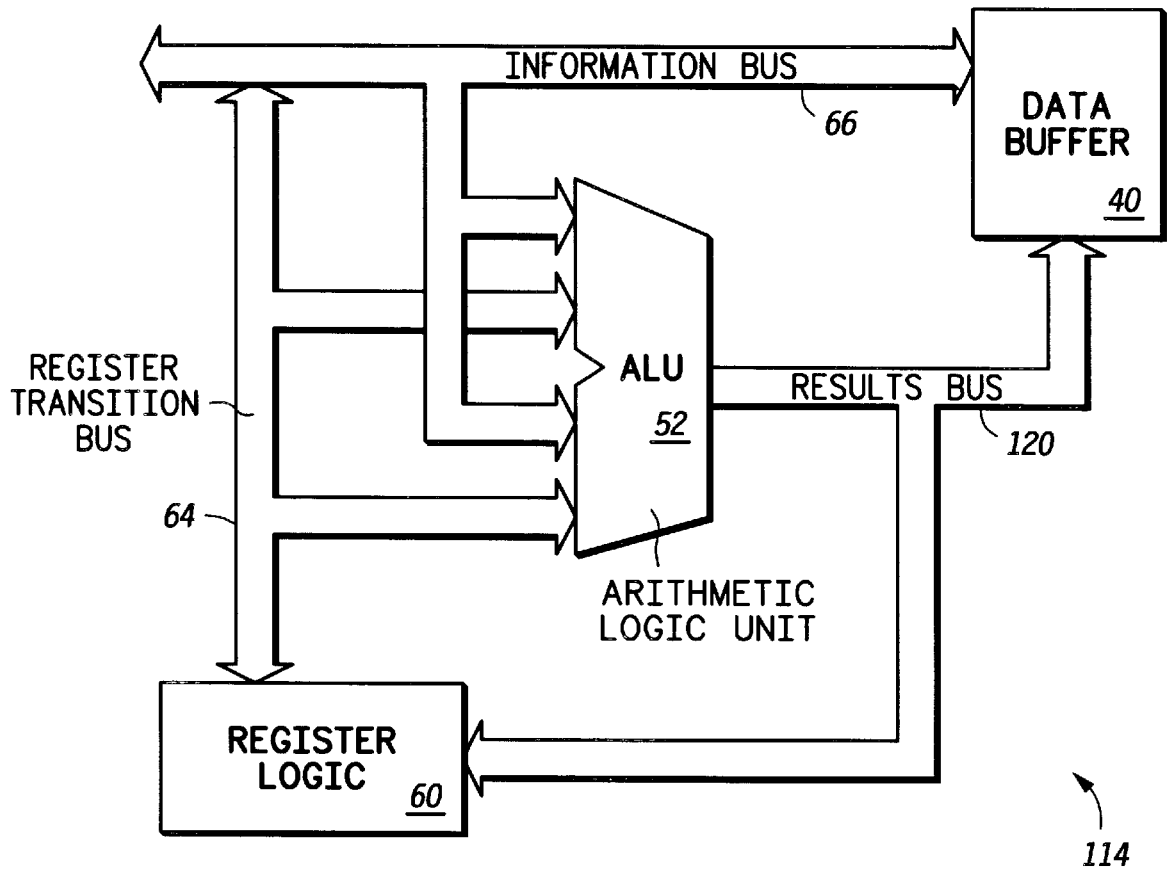
FIG. 10 is a block diagram of an execution unit of the data processor of FIG. 9.

Execution unit 114 is illustrated in greater detail in FIG. 10. Execution unit 114 generally includes a data buffer 40, an arithmetic logic unit (ALU) 52, and a register logic circuit 60. Register logic circuit 60 may include an accumulator, a condition code register, or other storage registers as may be needed. For example, an index register or a second accumulator may also be included. Implementation and use of such storage registers is well known in the art and will be apparent to one with ordinary skill in the art.

An External Information bus 41 provides address and data information to data buffer 40. External Information bus 41 receives the address and data information from Internal Address bus 36 and Internal Data bus 34, respectively. Data buffer 40 provides the values transferred via External Information bus 40 to remaining portions of execution unit 114 via an Information Bus. Register logic circuit 60 is bidirectionally coupled to Information Bus 66. Any additional registers such as accumulators and index registers would be similarly coupled to Information Bus 66.

Information Bus 66 is selectively coupled to a first input of ALU 56 and to a second input of ALU 52. Register logic 60 is also coupled to ALU 52 to provide information. ALU 52 processes each of the inputs to provide a plurality of results which are transferred via a Results bus 120. Results bus 120 provides the results provided by ALU 52 to register data buffer 40 and to register logic 60.

During operation, data processing system 110 receives input signals and uses internal memory 32 and CPU 112 to determine input grade labels and to execute rule evaluation operations. During operation, external bus interface 30 of data processing system 110 receives input data. CPU 112 then performs a fuzzification operation on the input data by comparing the input data to sets of predetermined parameters which comprise the input membership functions and define the positions and shapes of input labels. Execution unit 114 of CPU 112 performs the comparison operation and the predetermined parameters are stored in internal memory 32. The input data is compared to a given number of input labels within each input membership function and a grade is determined for each input label. The grade represents the conformity each input data has to that designated input label.

The graded input labels are then input to a min/max circuit in which the graded input labels are compared to a set of rules and sets of output labels are determined. Several methods currently exist for performing this operation and should be known to one with ordinary skill in the art.

Execution unit 114 of data processing system 114 then executes the defuzzification operation of the present invention. This defuzzification operation is discussed in greater detail below. In the present invention, equations (1), (2), and (3) are repeated for clarity's sake. The original discussion of each of these equations has been previously discussed in the Background portion of the present specification.

$$y0 = [\Sigma i=1,2,3 \Sigma y \; y \cdot mBi(y)]/[\Sigma i=1,2,3 \Sigma y \; mBi(y)] \quad (1)$$

$$y0 \approx \Sigma i=1,2,3 (yi \cdot gi)/\Sigma i=1,2,3(gi). \quad (2)$$

$$y0 \approx y1. \quad (3)$$

In the present invention, equation (2) for the simplified center of gravity (COG) method is generalized so as to cover a number of membership functions, as follows:

$$y0 \approx \Sigma i=1,2,3 \ldots (yi \cdot gi)/\Sigma i=1,2,3 \ldots (gi). \quad (4)$$

Out of all singletons, referred to also as "grades" herein, shortened by the respective consequent grades, n singletons, g1, g2, g3, . . . gn, are selected in magnitude order of the grades. Other singletons are neglected to obtain an approximate equation:

$$y0 \approx (y1 \cdot g1 + y2 \cdot g2 + y \cdot g3 + \ldots + yn \cdot gn)/(g1 + g2 + g3 + \ldots + gn). \quad (5)$$

Equation (5) can be written:

$$y0 \approx y1 + [g2(y2-y1) + g3(y3-y1) + \ldots + gn\,(yn-y1)]/(g1+g2+g3+ \ldots +gn) \quad (6)$$

Using an approximate relation:

$$g1 + g2 + g3 + \ldots + gn \approx 1, \quad (7)$$

the following approximate equation is obtained:

$$y0 \approx y1 + g2\,(y2-y1) + g3\,(y3-y1) + \ldots + gn(yn-y1). \quad (8)$$

In the min-max computation process, the product of the grades with one another is approximated by the minimum grade. Additionally, the sum of the grades is approximated by the maximum grade. When compared with these min-max approximations, equation (7) is a fairly close approximation. Furthermore, as a fuzzy controlled system approaches a target status, a particular grade becomes closer to unity and other grades approach zero. Therefore, the approximation by equation (7) is considered to become more accurate in the final stage of computation.

One of advantages of Equation (8) is that no dividing operation is needed. Dividing operations consumes a lot of time, require complicated hardware, and consume an excessive amount of overhead.

A second embodiment of the present invention includes a defuzzification method which selects a singleton (ZR) at the center of gravity as "g1" and makes the position "y1" equal to zero. Then "n–1" singletons, other than g1, are selected in magnitude order of the consequent grade and identified as g2, g3, . . . gn, where g2 is the highest consequent grade. By using this method, the center of gravity, y0, is the final result of defuzzification and is obtained by calculating the following approximate equation, where n=2,3,. . . :

$$y0 \approx g2\,y2 + g3\,y3 + \ldots + gn\,yn. \quad (8')$$

This equation does not need a subtraction operation. Therefore, the data processing system 110 can decrease the time needed to perform the required calculations while maintaining a high degree of accuracy. Accuracy is especially increased when the target of the system is at the center output label (ZR).

According to a third embodiment of the present invention, when n=2, equation (8) can be simplified to:

$y0=y1+g2(y2-y1)$ (Two grades Method) (9)

According to a further embodiment, when n=3, equation (8) may be simplified to:

$y0=y1+g2(y2-y1)+g3(y3-y1)$. (Three grades method) (10)

Figure 3:
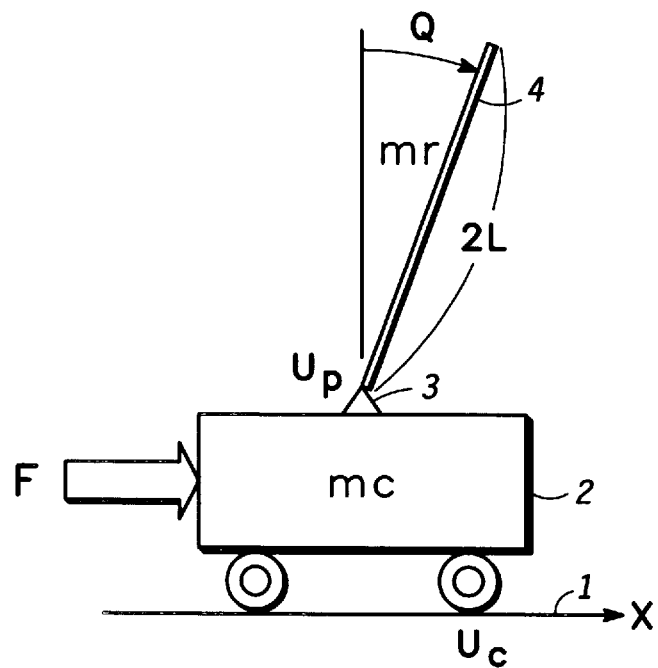
FIG. 3 is a physical model to be controlled in order to exemplify the accuracy and speed of a defuzzifying method according to an embodiment of the present invention.

Fuzzy controls according to the above equations may be processed by data processing system 110 to simulate the physical model illustrated in FIG. 3. As shown in FIG. 3, a car 2 with wheels is supported on a pair of horizontal rails 1. A hinge 3 is fixed on the top of car 2. A bar 4 is pivotally mounted to hinge 3. Bar 4 can freely rotate only in a plane parallel to rails 1. In this physical model, bar 4 is controlled so as to remain vertical by applying a horizontal force F to car 2.

Figure 4:
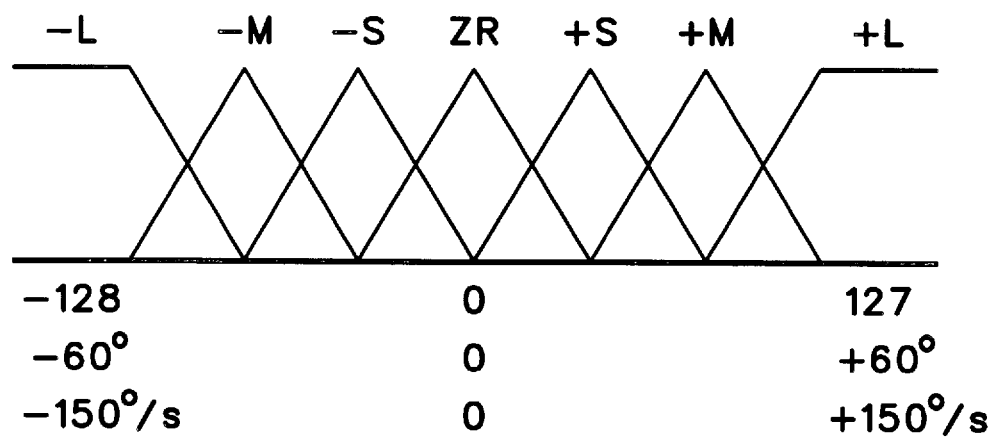
FIG. 4 shows input label's membership functions defined for controlling the physical model shown in FIG. 3.

The inclination Q of bar 4 from the vertical line and its derivative dQ/dt are used as fuzzy input variables. Seven input labels zero (ZR), large (±L), medium (±M) and small (±S) are defined. Their membership functions are illustrated in FIG. 4. Inclination Q varies from −60° to +60° and derivative dQ/dt varies from −150°/s to +150°/s. Both are represented by an internal parameter from −128 to +127 in the present system.

Figures 5, 6:
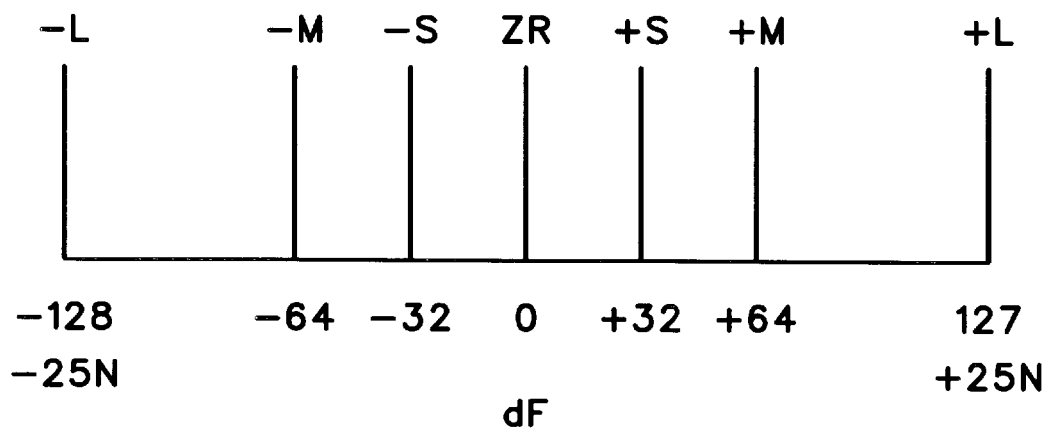
FIG. 5 shows output label's membership functions defined for controlling the physical model shown in FIG. 3.
FIG. 6 is a chart illustrating fuzzy rules defined for controlling the physical model shown in FIG. 3.

A differential force dF is controlled as a fuzzy output variable. Seven input labels zero (ZR), large (±L), medium (±M) and small (±S) are also defined for differential force dF. The corresponding membership functions are illustrated as singletons in FIG. 5. The differential force dF varying from −25 Newton to +25 Newton is represented by the internal parameter from −128 to +127 in the present system.

The relationships between the input labels and output labels are defined by the following fuzzy rules.

If Q=ZR and dQ/dt=−L then dF=−L
If Q=ZR and dQ/dt=−M then dF=−M
If Q=ZR and dQ/dt=−S then dF=−S
If Q=ZR and dQ/dt=ZR then dF=ZR
If Q=ZR and dQ/dt=+S then dF=+S
If Q=ZR and dQ/dt=+M then dF=+M
If Q=ZR and dQ/dt=+L then dF=+L
If Q=−L and dQ/dt=ZR then dF=−L
If Q=−M and dQ/dt=ZR then dF=−M
If Q=−S and dQ/dt=ZR then dF=−S
If Q=+S and dQ/dt=ZR then dF=+S
If Q=+M and dQ/dt=ZR then dF=+M
If Q=+L and dQ/dt=ZR then dF=+L
If Q=+S and dQ/dt=−S then dF=+S
If Q=−S and dQ/dt=+S then dF=−S In this simulation model, information on the position of car 2 is "don't cared" as seen from the fuzzy rules, and therefore the position is not controlled.

In the physical model, if the length of bar 4 is represented by 2L, the masses of bar 4 and car 2 are represented by $m_r$ and $m_c$ respectively, the coefficient of friction between wheels and rails 1 is $u_c$, the coefficient of friction between hinge 3 and bar 4 is $u_p$, and the gravity constant is G, the model's equation of motion is given by $$d_2Q/dt^2 = [G \sin Q - (dQ/dt)(u_p/m_rL) + \cos Q [-F - m_rL \times$$ (11)
$$(dQ/dt)^2 \sin Q \pm u_c]/(m_c + m_r)]/L[4/3 - m_r \cos^2 Q/(m_c + m_r)]$$

$$d^2x/dt^2 = [F - \pm u_c + m_rL [\sin Q (dQ/dt)^2 -$$ (12)
$$\cos Q \, dQ^2/dt^2]]/[m_c + m_r]$$

During defuzzification of the system illustrated in FIG. 3, the initial values for Q, dQ/dt and F are 35°, 0°/s and 0 Newton, respectively. A differential force, dF, responding to the initial values is calculated by fuzzy operation and added to the current force F, and a new force F (=F+dF) is obtained. Next, this new force F is substituted into equations (11) and (12) to obtain a new Q and dQ/dt. Further, a new differential force, dF, responding to the new Q and dQ/dt was calculated. These calculations are repeated. The results are illustrated in FIG. 7.

Figure 7:
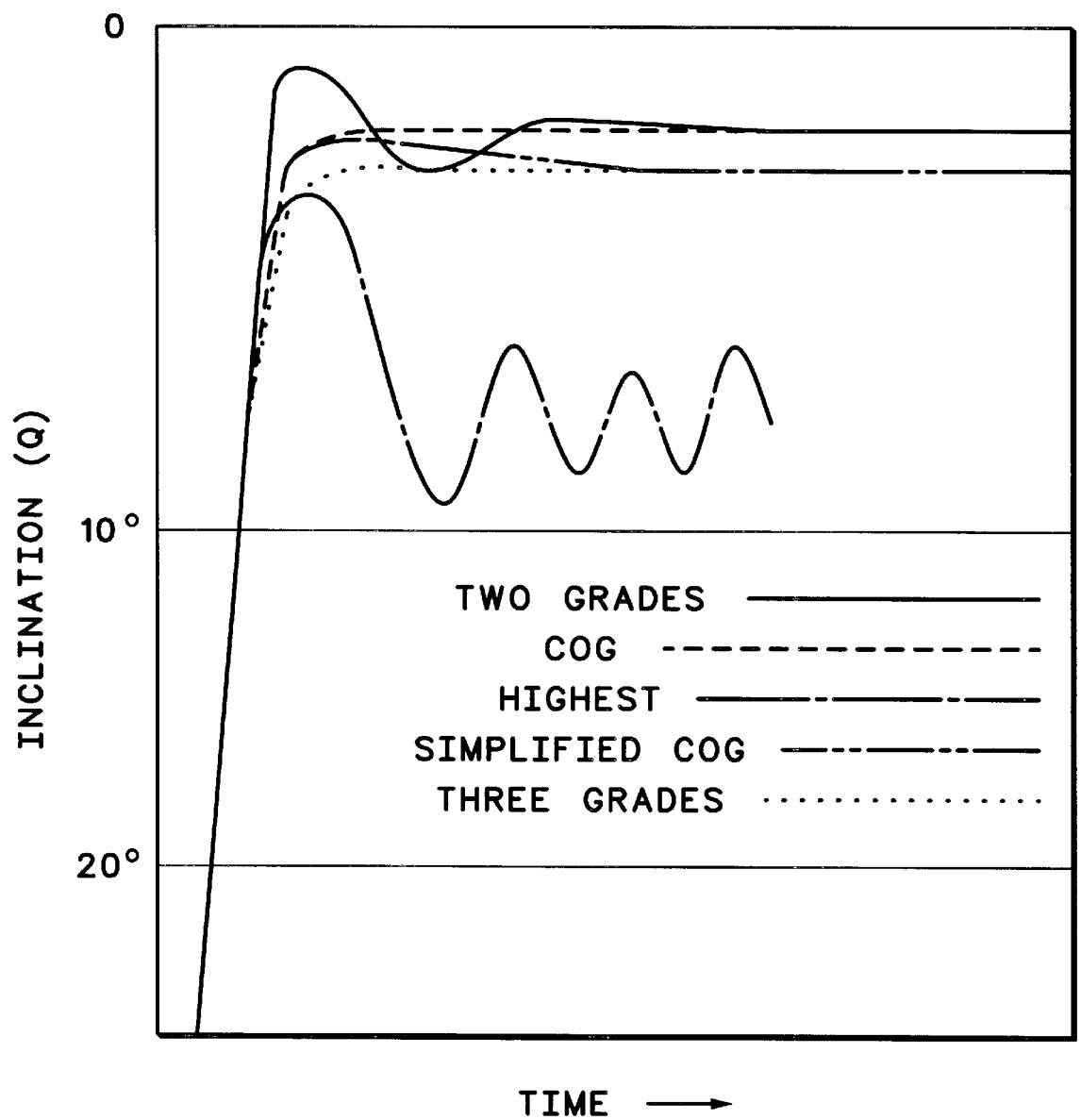
FIG. 7 is a chart illustrating simulation results in case of controlling the physical model shown in FIG. 3.

Referring to FIG. 7, a broken line illustrates the result of simulation of the most accuracy prior center of gravity (COG) method using all seven output labels. A two-dot chain line illustrates the result of simulation of the prior simplified center of gravity (COG) method using equation (2). A one-dot chain line illustrates the result of simulation of the prior highest method using equation (3). A solid line illustrates the result of simulation using equation (9) according to the first specific embodiment of the invention. A dotted line illustrates the result of simulation using equation (10) according to the second embodiment.

The center of gravity (COG) method according to equation (1) provided the ideal result nearest the critical control. From the view point of less ripples due to less overshooting, good results were obtained in the three grades method and the simplified center of gravity (COG) method. Constant errors appear in these two methods, and that is believed to be resulting from crossovers of membership functions to each other which were not omitted in these singleton methods.

From the view point of less ripples and no constant error, a good result was obtained in the two grades method of equation (9). It should be noticed that the two grades method converged to the same value as the most accurate center of gravity (COG) method. It is believed that the second largest grade frequently changes because it oscillates around the largest grade whenever the defuzzifying calculation is performed. Therefore, the two grades method of calculation compensates the constant error which appeared in the three grades method. The overshooting seen in the two grades method of calculation also has a very high calculation speed.

While the present invention has been shown and described with reference to particular embodiments thereof, various modifications and changes thereto will be apparent to one skilled in the art and are within the spirit and scope of the present invention.

We claim:

1. In a data processing system for executing a fuzzy inference operation having a plurality of output label membership functions, wherein each of the plurality of output label membership functions is represented by a singleton having a corresponding position, yi, and a corresponding consequent grade, gi, a defuzzification method comprising the steps of:

receiving the plurality of output label membership functions via a data buffer;

communicating the plurality of output label membership functions via an information bus;

enabling an execution unit of the data processing system to select and identify a plurality of n singletons in a magnitude order corresponding to a plurality of consequent grades, the magnitude order being g1, g2, . . . , gn, where g1 is a highest value, the execution unit being coupled to the information bus; and enabling an arithmetic logic unit of the data processing system to determine a center of gravity, y0, as a final result of the defuzzification method using an equation where n is a number of input label membership functions, said equation is:

$$y0 \approx y1 + g2(y2-y1) + \ldots + gn(yn-y1).$$

2. The defuzzifying method of claim 1 wherein n indicates two input label membership functions and the arithmetic logic unit calculates the center of gravity, y0, as:

$$y0 \approx y1 + g2(y2-y1).$$

3. The defuzzying method of claim 1 wherein n indicates three input label membership functions and the arithmetic logic unit calculates the center of gravity, y0, as:

$$y0 \approx y1 + g2(y2-y1) + g3(y3-y1).$$

4. In a data processing system for executing a fuzzy inference operation having a plurality of output label membership functions, wherein each of the plurality of output label membership functions is represented by a singleton having a corresponding position, yi, and a corresponding consequent grade, gi, a defuzzification method comprising the steps of:

receiving the plurality of output label membership functions via a data buffer;

communicating the plurality of output label membership functions via an information bus;defining the position y1 of a predetermined singleton g1 as zero;

enabling an execution unit to select and identify a portion of singletons which do not include the predetermined singleton g1 in magnitude order of the consequent grade as g2, g3, ..., gn, where g2 is a highest value, the execution unit being coupled to the information bus; and enabling an arithmetic logic unit to obtain a center of gravity value, y0, as a final result of the defuzzification method where n is a number of input label membership functions according to the following equation is:

$$y0 \approx g2y2 + g3y3 + \ldots + gn\, yn.$$

5. The defuzzification method according of claim 4 wherein the number of input label membership functions, n, is 2, and the arithmetic logic unit calculates the center of gravity, y0, using the following approximate equation:

$$y0 \approx g2y2.$$

6. The defuzzification method according to claim 4 wherein the number of input label membership functions, n, is 2, and the arithmetic logic unit calculates the center of gravity, y0, using the following approximate equation:

$$y0 \approx g2y2 + g3y3.$$

7. The defuzzification method of claim 4 wherein said predetermined singleton g1 is a singleton having a position y1 at a center of a centroid weight axis.

8. The defuzzification method of claim 4 wherein said predetermined singleton g1 is a singleton corresponding to a minimum control amount.

* * * * *